July 14, 1964   E. L. CHEH   3,140,773
CARRY STRIP
Filed Aug. 29, 1962

INVENTOR.
ERNEST L. CHEH
BY
ATTORNEY

3,140,773
CARRY STRIP
Ernest L. Cheh, Norwalk, Conn., assignor to Burndy Corporation, a corporation of New York
Filed Aug. 29, 1962, Ser. No. 220,218
3 Claims. (Cl. 198—131)

This invention pertains to feed belts for transporting articles to be processed, into processing machines, and particularly relates to a feed belt for electrical connectors which must be transported in uniformly spaced side by side relation.

Automatic processing of strip or belt fed articles such as electrical connectors generally requires accurate positioning of the articles on the strip and quick release following the final processing step. Since the strips are often discarded after a single use, it is essential that manufacturing costs be reduced to a minimum consistent with maintenance of required dimensional accuracy. Thus, the costs of locating and forming article positioning means on the raw belt or strip material are of considerable importance.

Most article feed belts or carry strips in current use employ recesses and cavities individually heat or pressure molded in a strip of suitable flexible material, for receiving and positioning articles to be carried. The costs of forming equipment and dies for these processes tend to run high. In most instances a separate and complete set of forming dies is required for each different size of article to be carried, further adding to production costs. In addition, these belts often must possess sufficient structural rigidity to resist buckling under the pushing and pulling forces exerted by feed mechanisms. This generally requires a thicker, stiffer strip which necessitates additional strip material and stronger forming dies, thereby further adding to the belt production costs.

Accordingly, it is an object of this invention to provide an article carry strip which may be produced by means of inexpensive processes and equipment.

It is a further object to provide a carry strip wherein a major portion of the article positioning supporting means thereon are common to a range of different article sizes.

Still another object is the provision of a carry strip which may have a reduced thickness while retaining sufficient stiffness for machine handling.

I have found that a carry strip meeting the foregoing requirements of structural rigidity and accurate location of the positioning means may be produced by forming a plurality of transversely spaced apart longitudinal ribs or ridges on a surface of a flexible strip, and cutting longitudinally spaced apart sets of notches or apertures in the strip and ribs to form a plurality of receiving and supporting structures. A strip having a given set of ribs or ridges may thus be adapted to any of a range of sizes of articles by merely changing the inexpensive cutting dies which form the notches and apertures. The longitudinal ribs also provide a longitudinal stiffening effect which permits use of a thinner strip having stiffness equal to one conventionally formed.

Such a strip, having integral ribs of any desired relative dimensions may be satisfactorily formed in accordance with this invention by inexpensive extrusion of a flexible plastic material such as a slightly plasticized polyvinyl acetate. Notches and apertures may be most conveniently formed by punch dies which punch out specific areas of the strip and ribs.

These and other objects, features and advantages of this invention will be made more apparent by reference to the following specification taken in conjunction with the accompanying drawings wherein.

Figure 1:
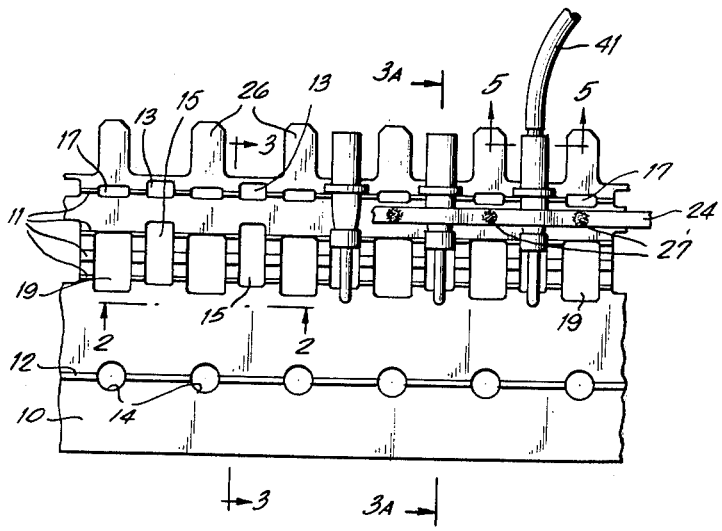
FIGURE 1 is a plan view of a length of connector carrying tape showing several connectors supported thereon and attached thereto.

Referring now to the drawings, a carry strip formed in accordance with this invention may be seen to comprise generally an elongate strip of flexible material 10 having longitudinally extending ribs 11 and 12 and uniformly spaced apertures 13–15, 17 and 19 which divide the ribs into a plurality of longitudinally spaced apart sections 21. In the embodiment shown in FIGURE 1, apertures 13 and 14 in adjacent ribs are axially aligned transverse to the strip to form continuous article receiving channels 16 extending through all the ribs, although it is obvious that other combinations of offset and aligned channels are possible. Apertures 17 and 19, spaced intermediate adjacent sets of apertures 13 and 15, serve to reduce the total strip weight and increase strip flexibility in the heavily ribbed area surrounding ribs 11. In other embodiments, this same purpose may be served by spacing the article positioning apertures, such as 13 and 15, more closely together. Apertures 14 are feed holes which may be engaged by sprocket teeth (not shown) on a processing machine to advance the strip from position to position. Rib 12, divided into longitudinal sections by apertures 14 provides additional longitudinal stiffening to resist the forces exerted by the sprocket teeth.

Figure 5:
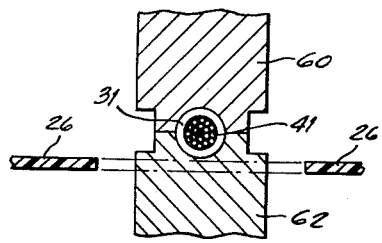
FIGURE 5 is a partial end section view taken along line 5—5 of FIGURE 1, showing in addition an illustrative pair of crimping jaws in crimping position on a connector mounted to a tape.
Figure 3A:
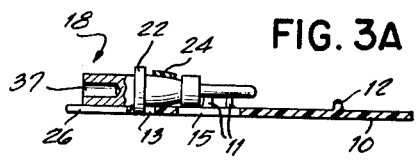
FIGURE 3A is a transverse section view of the carry strip and attached connector taken along line 3A—3A of FIGURE 1.

Connector 18 is typical of the type of electrical connector which must be transported by carry strips such as are contemplated by this invention. It is seen to include a cylindrical barrel portion 31 adapted to be deformed around a conductor to form an electrical and mechanical connection thereto, one or more angular collars 33 which act as stops and detents for parts (not shown) mating with the connector, and probe 35 which is received in a matching bore in a mating connector (not shown) to establish an electrical connection. Carry strips are most often employed to transport these connectors through a machine wherein a conductor 41 is inserted into bore 37 of each barrel 31, and the barrel is then crimped onto the conductor by two or more pressure applying jaws such as 60 and 62, shown in FIGURE 5.

To facilitate crimping while the connector is mounted on the tape, barrel 31 may be positioned to project beyond one edge of the strip. The strip may in turn be provided with projecting fingers 26 extending from the strip edge intermediate and beyond the barrels 31 to protect them from accidental damage when the strip is stored, for instance in coil form. However, it is not absolutely necessary that the barrel 31 or any similar portion extend beyond the strip, since crimping or indenting mechanisms capable of operating on the barrel directly through the strip are well known.

Figure 2:
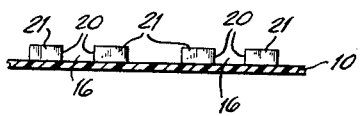
FIGURE 2 is a partial edge section view taken along line 2—2 of FIGURE 1.
Figure 3:
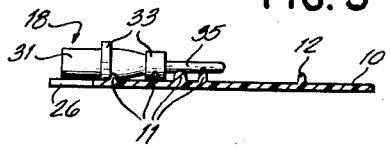
FIGURE 3 is a transverse section view of the carry strip taken along line 3—3 of FIGURE 1.

As shown in FIGURES 1 and 2, the longitudinal dimensions of apertures 13 and 15 in the strip 10, which form opposed end walls 20 on rib sections 21 are chosen so as to position the end walls for engaging opposite sides of at least a part of a connector disposed between them. Preferably two transversely spaced apart sets of end walls are positioned to so engage each connector so as to prevent angular and longitudinal movement relative to the strip. A portion of the larger of annular collars 33 on connector 18 protrudes into aperture 13 and engages one edge of the aperture and the corners of adjacent rib sections 21 to hold the connector against movement transverse to the strip. With connectors of other configuration both edges of apertures 13 or 15 or one edge from each aperture may engage a shoulder or shoulders on the connector to prevent transverse motion. For example in the embodiment shown in FIGURE 4, an aperture 54 engages opposite sides of collar 64 on a similar connector 65 to hold the connector against transverse movement without the aid of the rib sections. Similarly with connectors of different configurations, other of ribs 11 may engage the connector body; a connector with a probe 35 of diameter greater than shown in FIGURE 3 might, for example, engage all of the ribs shown.

Figure 4:
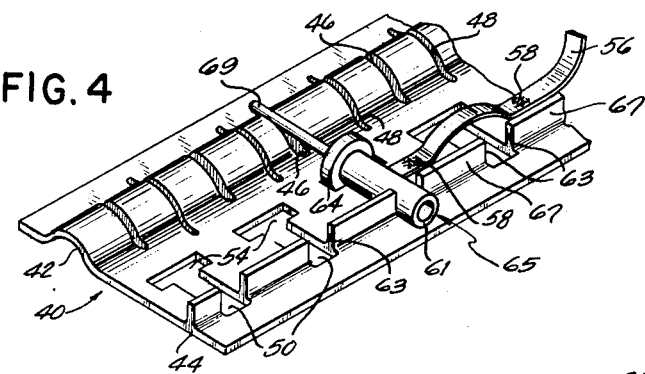
FIGURE 4 is a pictorial representation of a carrying strip showing another embodiment of this invention with an exemplary connector and partial holding strip shown in assembled position.

In the carry strip embodiments shown in FIGURE 4 the strip 40 is seen to include an integral rib 44 and a ridge 42, both of which may be formed by extrusion. Apertures or slots 46 in ridge 42 form slots for receiving probe 69 of connector 65. The probe is thus engaged between opposite sides of the slot at two separate points, i.e. at each side of the ridge, to prevent longitudinal movement. The connector is further held against longitudinal movement on the strip by engagement of barrel portion 61 between end walls 63 of rib sections 67. Sections 67, contiguous with combined apertures 50 and 54, may be integrally formed by a single punching operation. As has been previously noted, the transversely opposed edges of aperture 54 engage collar 64 to prevent transverse motion of the connector 65. Additional slots 48 in ridge 42 intermediate slots 46 serve the same function as apertures 17 and 19 in the embodiment of FIGURE 1, i.e. to reduce total strip weight and increase flexibility of the ridge.

Where the carry strip is to be used in continuous running, horizontal transport feed mechanisms, the article positioning and supporting means herein described are fully adequate to assure that the article will be delivered to the processing machine in the desired position. However, where the strip is operated other than horizontally upright, or is subjected to bending or flexing, or repeated jolting such as in step by step feed mechanisms, it is usually necessary to provide means for preventing undesired movement of the articles normal to the strip surface. Holding strips 24 and 56 shown in FIGURES 1 and 4 respectively, are convenient means for satisfying this requirement. The holding strip, which may be of an elastic material or a flexible plastic similar to the carry strip itself, is drawn over each article and secured to the carry strip between adjacent articles at points 27 or 58 by heat fusing the two strips or by any other suitable and well known fastening means. Release of articles thus secured to the carry strip may be accomplished by cutting or tearing the strip adjacent each article, by stretching each loop either permanently or elastically, or by releasing the fastening means at points 27 or 58. The latter may be accomplished, for example, by a punching die adapted to punch out apertures in the strip encompassing the fastening points.

I claim:
1. A carry strip for transporting a plurality of generally cylindrical articles having longitudinal sections of different diameters, through a machine in which they are to be processed, comprising:
   a longitudinally extending strip of flat flexible material having a plurality of parallel longitudinal ribs substantially perpendicular to a surface thereof; said strip including a first plurality of longitudinally spaced apart apertures forming channels through said ribs transverse to said strip, and a second plurality of apertures axially aligned with and spaced from said channels; said second plurality of apertures being dimensioned to partially receive axial portions of said article having one diameter for preventing substantial transverse motion of said articles; said channels being dimensioned to receive axial portions of said articles having another diameter for preventing substantial longitudinal motion of said articles; releasable means secured to said strip for retaining said articles in said channels and apertures; and a plurality of longitudinally spaced apart surface discontinuities on said strip adapted for engagement by said machine.

2. As an article of manufacture, a carry strip for transporting a plurality of similar objects having protruding portions, in spaced apart side-by-side relationship which comprises: a strip of flat flexible material having a plurality of longitudinally extending ridges formed on a surface thereof; a plurality of longitudinally spaced apart sets of notches formed in said ridges transverse to said strip, each set including at least one notch in each ridge; a plurality of longitudinally spaced apart apertures formed in said strip, successive apertures being substantially transversely aligned with successive sets of notches; the notches of each set being dimensioned to form a supporting trough for one of said objects, and each aperture being dimensioned for receiving the protruding portion of the object supported in the corresponding set of notches to substantially prevent transverse motion of the object on the strip.

3. The carry strip of claim 2, further including means for releasably securing said objects in said notches, said means comprising a strip of severable flexible material drawn over each objects and fastened on opposite sides thereof to said ridged strip.

References Cited in the file of this patent
UNITED STATES PATENTS

| | | |
|---|---|---|
| 1,853,261 | Dawson | Apr. 12, 1932 |
| 2,379,934 | Seiferth | July 10, 1945 |
| 2,887,215 | Hutchison | May 19, 1959 |
| 3,048,268 | Rocchi | Aug. 7, 1962 |